United States Patent [19]

Sze et al.

[11] 4,259,646

[45] Mar. 31, 1981

[54] HIGH ENERGY KRCL ELECTRIC DISCHARGE LASER

[75] Inventors: Robert C. Sze, Santa Fe; Peter B. Scott, Los Alamos, both of N. Mex.

[73] Assignee: The United States of America as represented by the United States Department of Energy, Washington, D.C.

[21] Appl. No.: 28,740

[22] Filed: Apr. 10, 1979

[51] Int. Cl.³ ............................................. H01S 3/22
[52] U.S. Cl. ............................................ 331/94.5 G
[58] Field of Search .................................. 331/94.5 G

[56] References Cited

U.S. PATENT DOCUMENTS 3,991,385 11/1976 Fein et al. ...................... 331/94.5 G

OTHER PUBLICATIONS

LA-UR-79-193; "Theoretical Studies of Molecular Electronic Transition Lasers", by Hay et al.; submitted to *Annual Rev. of Phys. Chem.*
"Observation of Stimulated Emission in KrCl" by Eden et al.; *Appl. Phys. Lett.* 29 (6), Sep. '76.
"XeBr Exciplex Laser" by Searless; *Appl. Phys. Lett.* 28 (10), May '76.
"Stimulated Emission at 281.8 nm from XeBr" by Searless et al.; *Appl. Phys. Lett.* 27 (4) Aug. '75.
LA-ur-78-2748, "Improved Lasing Performance of XeCl Using Ar and Ne Diluents" submitted to *Appl. Phys. Lett.* Oct. 78: by Robert Sze.
"High Energy Lasing of XeBr in an Electric Discharge" by Sze et al.; *Appl. Phys. Lett.* 32 (8), Apr. '78.
"½-J Discharge Pomped KrF Laser" by Sze et al.; *Rev. Sci. Instrum.* 49 (6), Jun. '78.
"Intense Lasing in Discharge Excited Noble-Gb Monochlorides" by Sze et al.; *Appl. Phys. Lett.* 33 (5), Sep. '78.
"KrCl Laser Oscillation at 222 nm" by Murray et al.; *Appl. Phys. Letts.* 29 (4), Aug. '76.

*Primary Examiner*—William L. Sikes
*Assistant Examiner*—Leon Scott, Jr.
*Attorney, Agent, or Firm*—William W. Cochran, II; Paul D. Gaetjens; James E. Denny

[57] ABSTRACT

A high energy KrCl laser for producing coherent radiation at 222 nm. Output energies on the order of 100 mJ per pulse are produced utilizing a discharge excitation source to minimize formation of molecular ions, thereby minimizing absorption of laser radiation by the active medium. Additionally, HCl is used as a halogen donor which undergoes a harpooning reaction with metastable $Kr_M^*$ to form KrCl.

11 Claims, 3 Drawing Figures

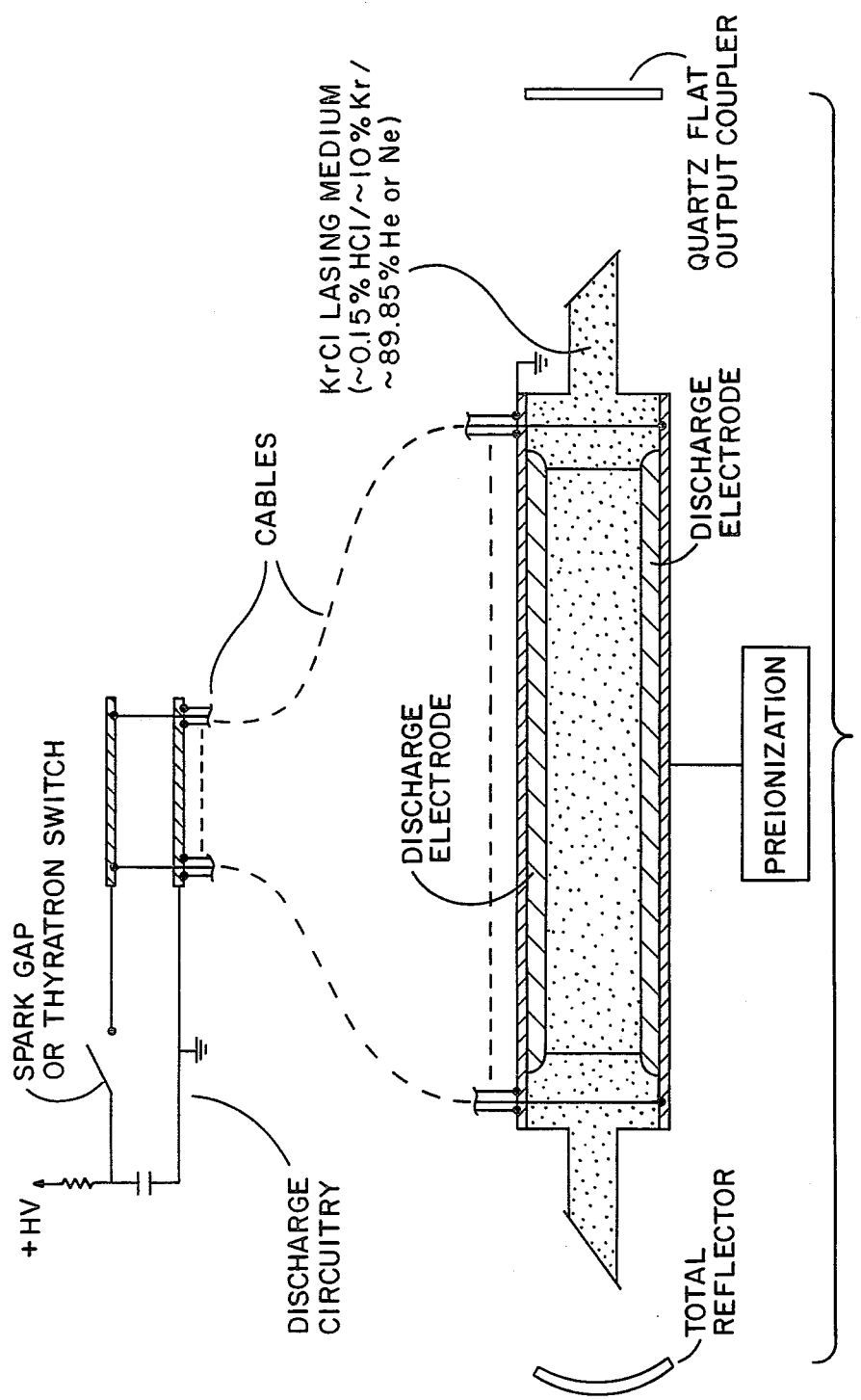

HIGH ENERGY KRCL ELECTRIC DISCHARGE LASER

BACKGROUND OF THE INVENTION

The present invention pertains generally to lasers and more particularly to excimer lasers.

Laser oscillations in KrCl were first achieved in electron beam pumped devices by J. R. Murray and H. T. Powell, Appl. Phys. Letts. 29, 252 (1976). As disclosed by Murray and Powell supra, $Cl_2$ was used as a halogen donor and laser oscillations obtained were near threshold level. Using prior art e-beam excited lasers, KrCl has not shown promise of becoming a useful coherent source of ultraviolet radiation due to its low output energy.

Ishchenko et al. have reported lasing in XeCl and low-energy lasing in KrCl with $BCl_3$ as the halogen donor, as reported in Opt. Comm. 21, 30 (1977). Use of HCl as a halogen donor in an electric discharge system was thought to be untenable in view of the fact that the dissociation energy of HCl and the photon energy of KrCl lasers is within 0.02 eV of the $^3P_1$ resonance trapped state of Kryton. Consequently, harpooning reactions: $Kr_M^* + HCl \rightarrow KrCl^* + H$, were thought to be inefficient due to the minimal amount of energy available from $Kr_M^*$. Consequently, the use of HCl as a halogen donor in an electric discharge KrCl laser was not attempted.

Furthermore, the use of prior art e-beam excited KrCl lasers, unknowingly, forms an initially large number of atomic and molecular ions such as $Kr_2^+$, $Ar_2^+$ and $Ne_2^+$ which absorb the 222 nm laser radiation, thereby impeding generation of a high energy lasing output. Formation of atomic and molecular ions in prior art e-beam excited discharges is unavoidable since the e-beam excited discharge functions by dissociating $CL_2$ and ionizing the Kr gas by deposition of a large amount of energy in the active medium to form free $Kr^+$ and $Cl^-$, which interact to form KrCl. Consequently, a large number of $Kr_2^+$, $Ar_2^+$ and $Ne_2^+$ molecular ions are initially formed by the e-beam device which have an absorption spectrum which overlaps the 222 nm output frequency, resulting in low output lasing energies.

SUMMARY OF THE INVENTION

The present invention overcomes the disadvantages and limitations of the prior art by providing a high energy KrCl electric discharge laser using HCl as a halogen donor. According to the present invention, the electric discharge produces Krypton metastables ($Kr_M^*$) which react with the HCl halogen donor to form the KrCl* exciplex according to the harpooning reaction: $Kr_M^* + HCl \rightarrow KrCl^* + H$. In this manner, formation of molecular ions is minimal so that output lasing energy is greatly increased.

It is therefore an object of the present invention to provide a high energy KrCl electric discharge laser.

It is also an object of the present invention to provide a high energy KrCl electric discharge laser which utilizes HCl as a halogen donor.

Another object of the present invention is to provide a high energy KrCl electric discharge laser which minimizes formation of molecular ions.

Another object of the present invention is to provide a high energy KrCl electric discharge laser which generates KrCl from harpooning reactions between $Kr_M^*$ and HCl.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from the detailed description. The Abstract of the Disclosure is for the purpose of providing a nonlegal, brief statement to serve as a searching and scanning tool for scientists, engineers and researchers, and is not intended to limit the scope of the invention as disclosed herein, nor is it intended to be used interpreting or in any way limiting the scope or fair meaning of the appended claims.

BRIEF DESCRIPTION OF THE DRAWINGS

FIG. 3 is a schematic diagram of the electric discharge laser structure utilized in accordance with the present invention.

DETAILED DESCRIPTION OF THE PREFERRED EMBODIMENT OF THE INVENTION

Figure 1:
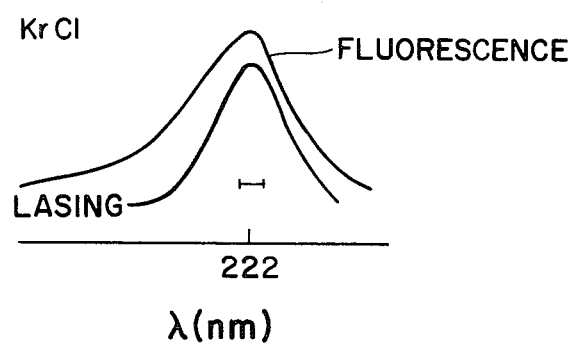
FIG. 1 is a microdensitometer trace of KrCl fluorescence and lasing spectrum.

FIG. 1 illustrates the fluorescence and lasing spectrum of KrCl. Fluorescence is shown in the upper curve while lasing at approximately 10 mJ is shown in the lower curve. Both the fluorescence and lasing are centered about 222 nm. Fluorescence is asymmetrical with no noticable absorption structures. Fluorescence spectroscopic data were obtained from a microdensitometer trace of the photograph spectra at 30 psia to avoid superfluorescence of the lasing medium.

As with noble gas monochlorides, successful intense lasing of KrCl according to the present invention, is based on utilizing the appropriate halogen donor, HCl, and lasing the excimer in an electric discharge where absorption caused by the formation of molecular ions such as $Ne_2^+$, $Ar_2^+$ and $Kr_2^+$ is minimized. Fractions of a percent of HCl in the primarily helium gas mix do not degrade the performance of the electrical discharge. Additionally, the sum of the dissociation energy of HCl and the photon energy of KrCl lasers is within 0.02 eV of the $^3P_1$ resonance trapped state of Kr. Although the lowest metastable state ($^3P_2$) in krypton is incapable of initiating harpooning reactions with HCl due to insufficient energy, the high crossection of excitation and deexcitation collisions of the metastable and resonance trapped states with thermal electrons, causes high population in the ($^3P_1$, $^3P_o$, $^1P_o$) metastable and resonance trapped states which have sufficient energy to prompt the harpooning reaction: $Kr_M^* + HCl \rightarrow KrCl^* + H$. In other words, although the $^3P_2$ resonance trapped state of $Kr_M^*$ by itself does not provide sufficient energy to initiate harpooning reactions as set forth above, the Boltzman distribution of energy in the three higher metastable and resonance trapped states of $Kr_M^*$, is capable of efficiently generating the harpooning reaction. As a result, a minimal number of molecular ions, which tend to absorb KrCl laser radiation at 222 nm and reduce output laser energy, are generated in the gas mix. In contrast, prior art e-beam KrCl lasers have energy pathways which proceed downward through the initial formation of the atomic ions Kr+ and Cl− by depositing large amounts of energy in the gaseous medium. The atomic ions Kr+ and Cl− interact to produce KrCl. Simultaneously, however, a large number of molecular ions are produced which absorb the laser energy. In contrast, the present invention utilizes an electric discharge in which energy pathways proceed upward by harpooning reactions, with minimal formation of molecular ions.

The particular electric discharge laser structure utilized is illustrated in FIG. 6 which comprises a 120 cm active length uv preionized device. A single capacitor discharge pulse charges an array of 76, 8-ft. long 40/100 cables distributed evenly along the discharge. The optical cavity of the device consists of a 3 meter dielectric coated total reflector and an uncoated quartz flat output coupler. A more complete disclosure of the discharge device is given by Sze and Scott in Rev. Sci. Instrum. 49, 772 (1978).

Figure 2:
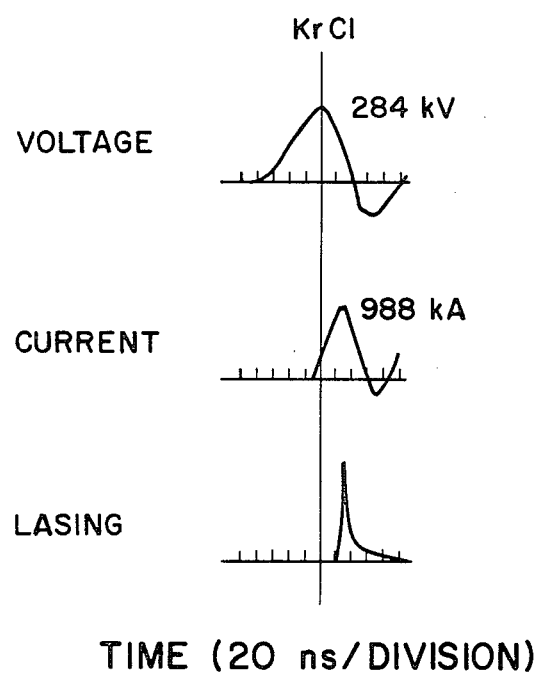
FIG. 2 illustrates the temporal characteristics of voltage, current and lasing for the KrCl excimer of the present invention.

The voltage, current and lasing temporal characteristics of the present invention, illustrated in FIG. 2, are produced with a 0.08 μF capacitor charged to 48 kV. The voltage and current characteristics illustrated are similar to other noble gas monohalide lasers utilizing this device. As shown in FIG. 1, the lasing period is somewhat less than 20 ns which is short compared to the onset of instabilities in the discharge. Lasing occurs from KrCl at 222 nm with an optimum gas mixture of 0.15% HCl/10% Kr/89.85% He at 41 psia filling pressure and 49 Kv charging voltage. At 55 psia filling pressure and 50 kV charging voltage, the laser output is 100 mJ.

The present invention therefore provides a high energy (100 mJ/pulse ) KrCl excimer laser providing coherent ultraviolet radiation at 222 nm. By utilizing an electric discharge system rather than an e-beam discharge system, formation of molecular ions is minimized since energy pathways proceed upward through the formation of $Kr_M^*$. KrCl is subsequently formed through harpooning reactions. In this manner, high energy outputs are obtained from the KrCl excimer laser of the present invention.

Obviously many modification and variations of the present invention are possible in light of the above teachings. For example, Ne can be used in place of He to provide even greater output powers. It is therefore to be understood that within the scope of the appended claims the invention may be practiced other wise than is specifically described. What is desired to be secured as Letters Patent of the United States is:

We claim:

1. In a KrCl excimer laser, the improvement comprising:
    a KrCl lasing medium including HCl as a halogen donor;
    electric discharge means for exciting said lasing medium to minimize the formation of molecular ions such that high output energies are produced by said KrCl excimer laser.
2. The laser of claim 1 wherein said lasing medium comprises:
    ∼0.15% HCl
    ∼10% Kr
    ∼89.85% He
3. The laser of claim 1 wherein said lasing medium comprises:
    ∼0.15% HCl
    ∼10% Kr
    ∼89.85% Ne
4. The laser of claim 1 wherein said electrical discharge means comprises a cable fed discharge system which produces a fast current rise time pulse in said lasing medium.
5. A high energy KrCl noble gas monohalide excimer laser comprising:
    an optical resonant cavity delimited by an energy abstracting means,
    a KrCl lasing medium containing HCl as a halogen donor, said KrCl lasing medium disposed within said optical resonant cavity;
    electrical discharge means for exciting said lasing medium to stimulate laser emission of KrCl and minimize formation of molecular ions and thereby minimize energy absorption by said lasing medium.
6. The laser of claim 5 wherein said KrCl lasing medium comprises HCl, Kr and He.
7. The laser of claim 5 wherein said KrCl lasing medium comprises HCl, Kr and Ne.
8. The laser of claim 5 wherein said electrical discharge means comprises a cable fed discharge system.
9. A high energy KrCl noble gas monohalide excimer laser comprising:
    an optical resonant cavity delimited by an energy abstracting means,
    a KrCl lasing medium containing HCl as a halogen donor, said KrCl lasing medium disposed within said optical resonant cavity;
    electrical discharge means for exciting said lasing medium to generate $Kr_M^*$ to form KrCl* according to the reaction: $Kr_M^* + HCl \rightarrow KrCl^* + H$, wherein M denotes metastable Krypton.
10. The laser of claim 9 wherein said KrCl lasing medium comprises HCl, Kr and He.
11. The laser of claim 9 wherein said KrCl lasing medium comprises HCl, Kr and Ne.

* * * * *